US007874829B2

(12) United States Patent
Kirkendall

(10) Patent No.: US 7,874,829 B2
(45) Date of Patent: Jan. 25, 2011

(54) METHOD AND APPARATUS FOR FORMING ADHESIVE STRIPS

(75) Inventor: Zachary L. Kirkendall, Derby, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 509 days.

(21) Appl. No.: 11/937,713

(22) Filed: Nov. 9, 2007

(65) Prior Publication Data

US 2009/0120586 A1 May 14, 2009

(51) Int. Cl.
*B29C 43/46* (2006.01)

(52) U.S. Cl. ....................................... 425/298; 425/362

(58) Field of Classification Search ................. 425/294, 425/298, 362, 363, 367

See application file for complete search history.

(56) References Cited

U.S. PATENT DOCUMENTS 2,400,527 A 5/1946 Aycock
2,717,419 A * 9/1955 Dickey ....................... 425/343
3,543,623 A * 12/1970 Wirstroem .................. 83/169
4,263,827 A 4/1981 Pontarollo
4,336,010 A * 6/1982 Thompson .................. 425/298
4,725,217 A * 2/1988 Nitta et al. .................. 425/335
6,562,436 B2 5/2003 George et al.
6,689,448 B2 2/2004 George et al.
6,709,538 B2 3/2004 George et al.

* cited by examiner

*Primary Examiner*—James Mackey
(74) *Attorney, Agent, or Firm*—Hovey Williams LLP

(57) ABSTRACT

A method and apparatus for forming adhesive strips from an adhesive sheet. The apparatus may generally comprise a first forming wheel, a second forming wheel, and a cutting wheel including a plurality of circumferential grooves. The cutting wheel can be positioned in proximity to the first and second forming wheels to define a first formation interface with the first forming wheel and a second formation interface with the second forming wheel. The cutting wheel can be operable to receive at least a portion of the adhesive sheet and rotate to force at least a portion of the adhesive sheet through the first formation interface and the second formation interface such that the adhesive sheet is at least partially cut by at least one of the circumferential grooves at both the first and second formation interfaces to at least partially form the adhesive strips.

13 Claims, 5 Drawing Sheets

METHOD AND APPARATUS FOR FORMING ADHESIVE STRIPS

BACKGROUND

1. Field

Embodiments of the present invention relate to methods and apparatuses for forming adhesive strips. More particularly, various embodiments of the invention provide methods and apparatuses for forming adhesive strips using dual forming wheels.

2. Description of the Related Art

It is often desirable to precisely form adhesive strips for use as fillings between structural gaps. For example, in aerospace applications, adhesive strips may be utilized to fill radius gaps between two angled or adjacent structural elements that do not precisely mate. In such applications, the adhesive strips may need to be very precisely formed to prevent geometric distortion of the structural elements that form the radius gaps. Typically, adhesive strips are formed by first trimming adhesive sheets and then separately forming the strips from the sheets. Such separate trimming and forming requires tedious manual labor and prevents the formation of constant adhesive strip dimensions.

SUMMARY

Embodiments of the present invention provide a distinct advance in the art of forming adhesive strips. More particularly, various embodiments of the invention provide methods and apparatuses for forming adhesive strips using dual forming wheels.

In various embodiments, the present invention provides an apparatus operable to form a plurality of adhesive strips from an adhesive sheet. The apparatus may generally comprise a first forming wheel, a second forming wheel, and a cutting wheel including a plurality of circumferential grooves. The cutting wheel can be positioned in proximity to the first and second forming wheels to define a first formation interface with the first forming wheel and a second formation interface with the second forming wheel. The cutting wheel can be operable to receive at least a portion of the adhesive sheet and rotate to force at least a portion of the adhesive sheet through the first formation interface and the second formation interface such that the adhesive sheet is at least partially cut by at least one of the circumferential grooves at both the first and second formation interfaces to at least partially form the adhesive strips.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

BRIEF DESCRIPTION OF THE DRAWING FIGURES

Various embodiments of the present invention are described in detail below with reference to the attached drawing figures, wherein.

Figure 2:
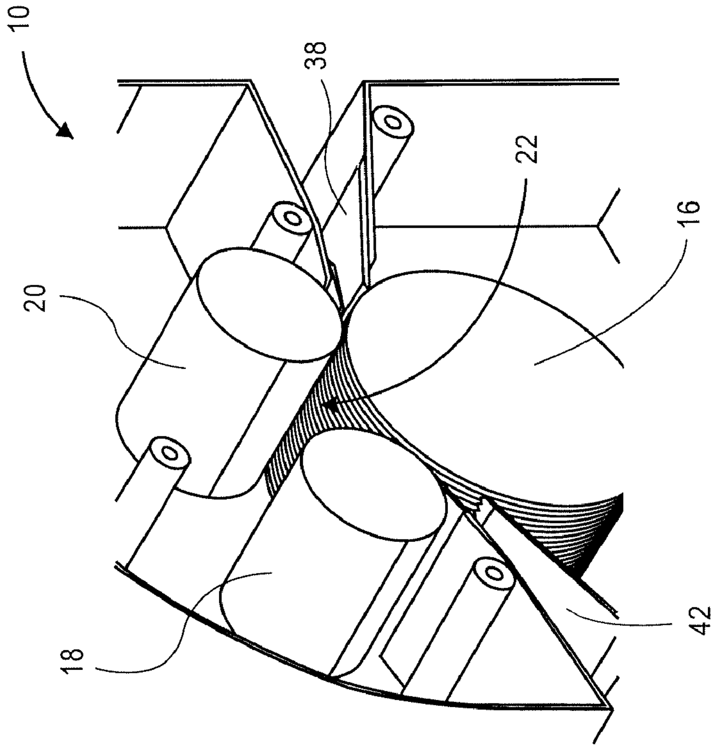
FIG. 2 is a perspective view of a cutting wheel and forming wheels comprising a portion of the apparatus of FIG. 1.

The drawing figures do not limit the present invention to the specific embodiments disclosed and described herein. The drawings are not necessarily to scale, emphasis instead being placed upon clearly illustrating various embodiments of the invention.

DETAILED DESCRIPTION

The following detailed description of various embodiments of the invention references the accompanying drawings which illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Various embodiments of the present invention provide an adhesive strip forming apparatus 10 operable to form a plurality of adhesive strips 12 from an adhesive sheet 14. As illustrated in FIGS. 1 through 9, the forming apparatus 10 may generally include a cutting wheel 16, a first forming wheel 18, and a second forming wheel 20. As is discussed in more detail below, the adhesive sheet 14 may be forced between the cutting wheel 16 and first forming wheel 18 and then between the cutting wheel 16 and second forming wheel 20 to form the adhesive strips 12 from the adhesive sheet 14.

Referring to FIG. 2, the cutting wheel 16 may present a generally cylindrical configuration and include a plurality of circumferential grooves 22 positioned around its circumference. The circumferential grooves 22 may encircle the entire circumference of the cutting wheel 16 or be positioned around only a portion of the circumference of the cutting wheel 16. In some embodiments, the circumferential grooves 22 may be formed within the cutting wheel 16 such as where the cutting wheel 16 presents an integral construction. In other embodiments the circumferential grooves 22 may be positioned around the circumference of the cutting wheel 16 by coupling groove-forming elements to the cutting wheel 16. For example, ridges, bands, belts, cutting elements, and the like may be coupled or otherwise affixed to the cutting wheel 16 to form the circumferential grooves 22. The cutting wheel 16 may be formed of any suitable material operable to form the adhesive strips 12 as discussed herein, including metals, plastics, combinations thereof, and the like.

The circumferential grooves 22 may present any shape, size, or configuration to produce the adhesive strips 12. As is discussed in more detail below, the adhesive sheet 14 is at least partially forced into at least some of the circumferential grooves 22 such that the dimensions of the circumferential grooves 22 can dictate the resulting dimensions and/or general shape of the adhesive strips 12. For example, in embodiments where the circumferential grooves 22 present a generally rectangular cross-sectional area, the adhesive strips 12 may be formed to similarly present a generally rectangular cross-sectional area. In some embodiments, the circumferential grooves 22 may present non-rectangular or irregular cross-sectional areas to produce adhesive strips 12 having any desired configuration.

Figure 8:
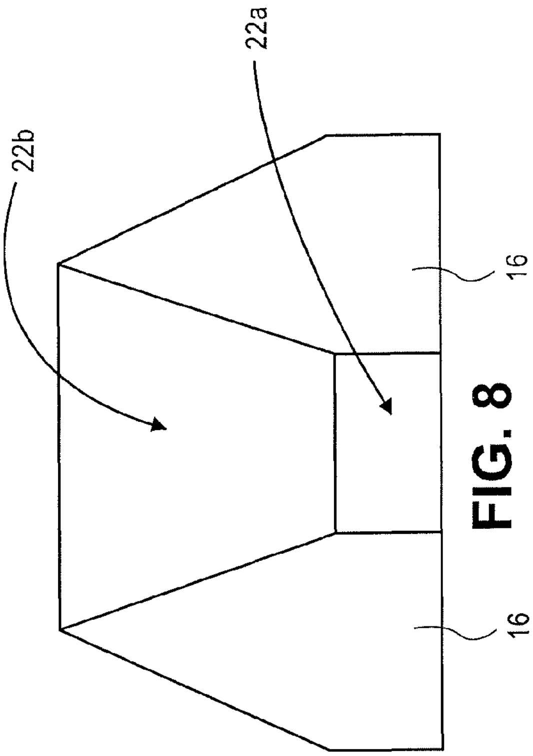
FIG. 8 is a cross section of a circumferential groove positioned on the cutting wheel of FIGS. 2-4.

In some embodiments, as illustrated in FIG. 8, one or more of the circumferential grooves 22 may include a bottom rake-receiving section 22*a* presenting a generally rectangular cross-sectional area and a top strip-formation section 22*b* presenting a generally trapezoidal cross-sectional area to produce the adhesive strips 12 with a desired configuration. As discussed in more detail below, the rake receiving section 22*a* may be utilized to extract the adhesive strips 12 from the circumferential grooves 22 without damaging or substantially altering the dimensions of the formed adhesive strips 12.

The cutting wheel 16 may present any dimensions suitable for cutting at least a portion of the adhesive sheet 14. However, in some embodiments, the dimensions of the cutting wheel 16 may be selected to correspond to the dimensions of the adhesive sheet 14, such as where the cutting wheel 16 presents a height that is substantially similar to the width of the adhesive sheet 14 to maximize usage of the adhesive sheet 14.

The circumferential grooves 22 may similarly present any dimensions to form the adhesive strips 12 in a desired configuration. In some embodiments, the circumferential grooves 22 may be about 0.02 inch to about 0.3 inch deep and about 0.05 inch to about 0.3 inch wide. In embodiments where the circumferential grooves 22 include the rake-receiving section 22*a* and the strip-formation section 22*b*, the rake-receiving section 22*a* may be about 0.04 inch to about 0.2 inch wide and about 0.02 inch to about 0.1 inch high and the strip-formation section 22*b* may have a height of about 0.03 inch to about 0.2 inch and a width of about 0.04 inch to about 0.3 inch. In some embodiments, the rake-receiving section 22*a* may have a width of about 0.08 inches and a height of about 0.05 inches and the strip-formation section 22*b* may be trapezoidal in configuration and have a height of about 0.095 inches, a first side width of about 0.08 inches and a second side width of about 0.16 inches. However, as discussed above, the circumferential grooves 22 and cutting wheel 16 may present any dimensions for at least partially forming the adhesive strips 12.

Figure 3:
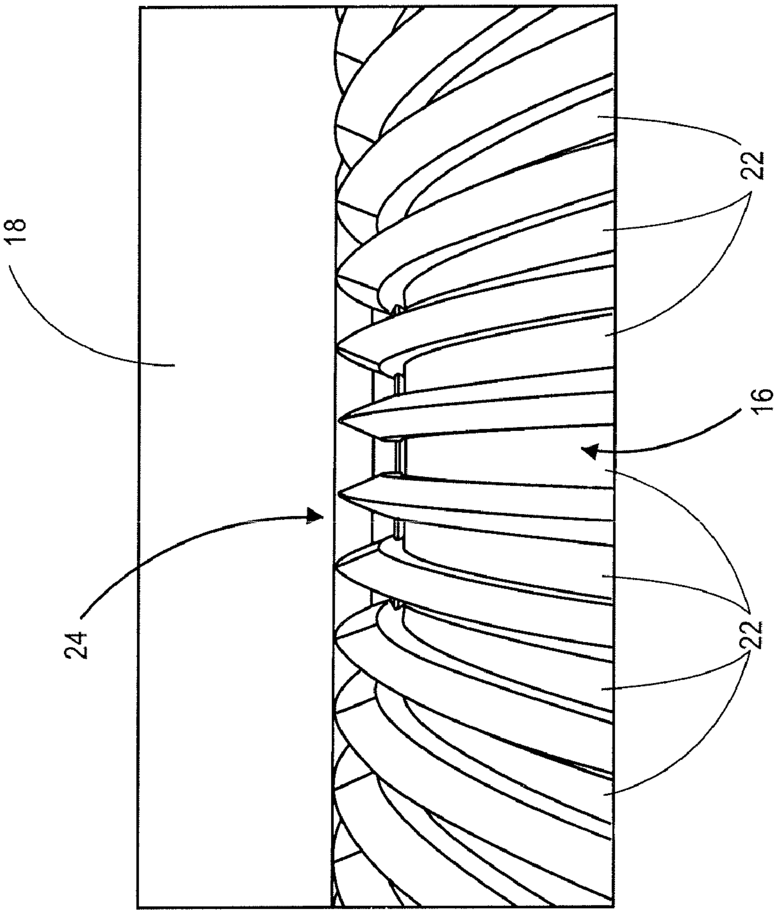
FIG. 3 is a perspective view of a formation interface formed between the cutting wheel and one of the forming wheels of FIG. 2.

As illustrated in FIG. 3, the first forming wheel 18 is operable to be positioned in proximity to the cutting wheel 16 to define a first formation interface 24 between the cutting wheel 16 and the first forming wheel 18. As is discussed in more detail below, at least a portion of the adhesive sheet 14 may be forced through the first formation interface 24 to be at least partially cut.

The first forming wheel 18 may present any dimensions operable to form the first formation interface 24 with the cutting wheel 16. In some embodiments the first forming wheel 18 may present a cylindrical configuration and have dimensions selected to correspond to the dimensions of the adhesive sheet 14 and/or cutting wheel 16, such as where the first forming wheel 18 presents a height similar to that presented by the cutting wheel 16. The first forming wheel 18 may present a diameter substantially smaller that the diameter of the cutting wheel 16 to enable the first and second forming wheels 18, 20 to be easily positioned around the cutting wheel 16.

At least portions of the surface of the first forming wheel 18 may be substantially smooth as illustrated in FIGS. 2-3 to allow the first forming wheel 18 to easily rotate without affecting the shape of the adhesive strips 12. Thus, in some embodiments, only the configuration of the circumferential grooves 22 will dictate the dimensions presented by the formed adhesive strips 12. However, the first forming wheel 18 may present any surface configuration and is not limited to smooth configurations.

The first forming wheel 18 may define the first formation interface 24 by directly abutting the outermost portions of the cutting wheel 16 such that the only volume between the cutting wheel 16 and first forming wheel 18 is the area within the circumferential grooves 22. However, in some embodiments, the first forming wheel 18 may be positioned away from the outermost portions of the cutting wheel 16 to vary the extent to which the adhesive sheet 14 is cut upon passing through the first formation interface 24. For example, when the first forming wheel 18 abuts the cutting wheel 16, the adhesive sheet 14 may be cut such that the adhesive strips 12 are formed and separated upon passing through the first formation interface 24. If the first forming wheel 18 is positioned away from the cutting wheel 16, the adhesive strips 12 may be partially formed by passing through the first formation interface 24 such that the adhesive strips 12 remain joined. Thus, by varying the position of the first forming wheel 18, the extent to which the adhesive sheet 14 is cut and the extent to which the adhesive strips 12 are formed by passing through the first formation interface 24 may be varied.

Figure 1:
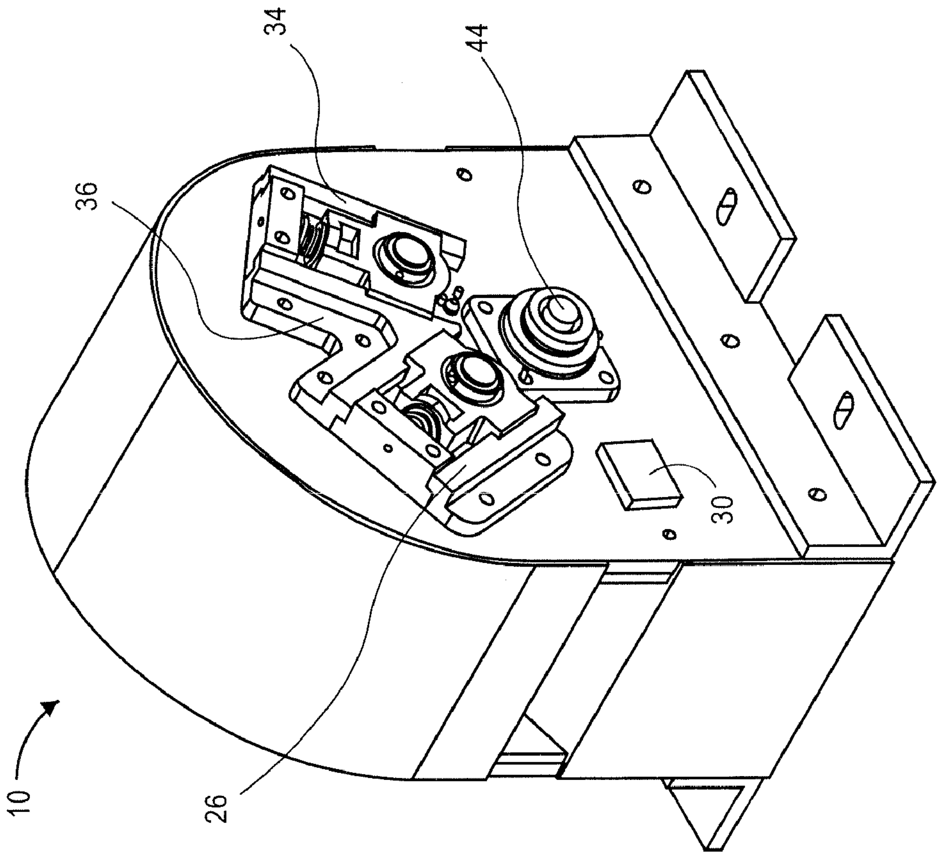
FIG. 1 is a front perspective view of an adhesive strip forming apparatus configured in accordance with various embodiments of the present invention.
Figure 5:
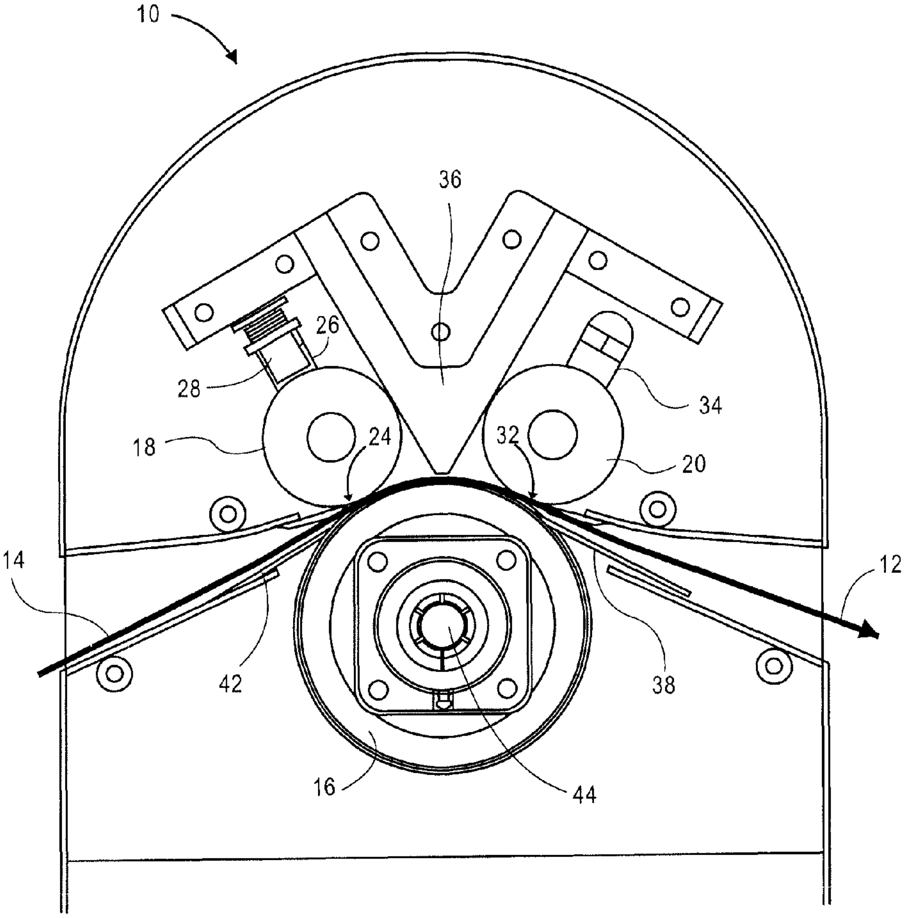
FIG. 5 is a rear view of the apparatus of FIG. 1.
Figure 6:
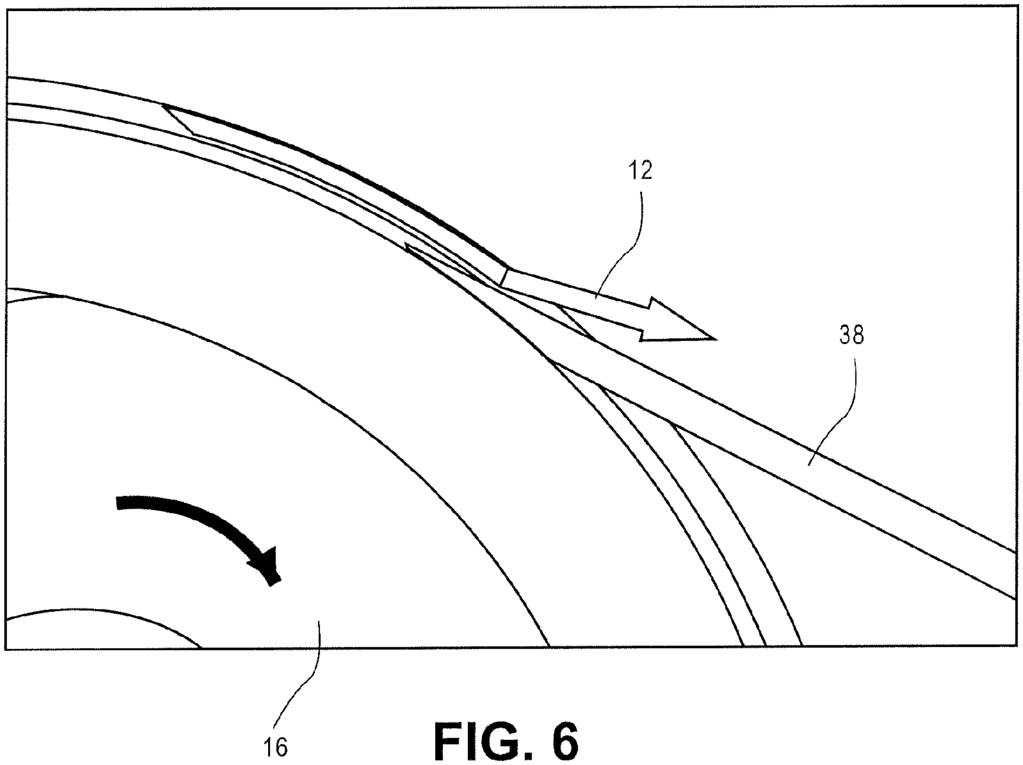
FIG. 6 is a side view of the extraction rake and cutting wheel of FIG. 4.

In some embodiments, the position of the first forming wheel 18 may be fixed such that the first formation interface 24 presents static dimensions. However, in other embodiments, the first forming wheel 18 may be repositionable to enable the first formation interface 24 to present variable dimensions and variable cutting functionality as is discussed in the preceding paragraph. As illustrated in FIGS. 1 and 5, the first forming wheel 18 may be coupled with a first fixed guide 26 to enable the first forming wheel 18 to be slidably repositioned while remaining properly oriented with respect to the cutting wheel 16. The first forming wheel 18 may be spring-biased to facilitate proper positioning of the first forming wheel 18 within the first fixed guide 26.

The first forming wheel 18 may be manually repositioned by an operator to vary the dimensions of the first formation interface 24, such as by sliding the first forming wheel 18 along the first fixed guide 26. However, in some embodiments, the first forming wheel 18 may be coupled with a first positioning element 28, such as an electric motor, solenoid, or the like, to automate positioning of the first forming wheel 18. For example, the first positioning element 28 may be controlled by a controller 30 to enable the first forming wheel 18 to be accurately positioned without operator involvement. The controller 30 may include a computing device, a processor, a microcontroller, a programmable logic device, analog or digital logic, combinations thereof, and the like. The first positioning element 28 may be coupled and/or mounted to a mounting rail 36 to statically affix its position in relation to the cutting wheel 16.

As illustrated in FIG. 3, the second forming wheel 20 is operable to be positioned in proximity to the cutting wheel 16 to define a second formation interface 32 between the cutting wheel 16 and the second forming wheel 20. As is discussed in more detail below, at least a portion of the adhesive sheet 14 may be forced through the second formation interface 32 to be at least partially cut.

In some embodiments, the second forming wheel 20 may be configured in a similar manner as the first forming wheel 18. Thus, the first and second forming wheels 18, 20 may both present similar dimensions and configurations. The second forming wheel 20 may be positioned such that the second formation interface 32 is defined at a location after the first formation interface 24 when the cutting wheel 16 rotates and drives the adhesive sheet 14 in a desired direction. For example, as illustrated in FIG. 5, the forming wheels 18, 20 may be about between −45 degrees and +45 degrees off a vertical axis running through the center of the cutting wheel 16, with the first forming wheel 18 positioned about between −45 and 0 degrees from the vertical axis and the second forming wheel 20 positioned about between 0 and +45 degrees from the vertical axis. However, the forming wheels 18, 20 may be positioned at any locations around the cutting wheel 16 and are not limited to the illustrated positions.

The second forming wheel 20 may define the second formation interface 32 by directly abutting the outermost portions of the cutting wheel 16 such that the only volume between the cutting wheel 16 and second forming wheel 20 is the area within the circumferential grooves 22. However, in some embodiments, the second forming wheel 20 may be positioned away from the outermost portions of the cutting wheel 16 to vary the extent to which the adhesive sheet 14 is cut upon passing through the second formation interface 32. For example, when the second forming wheel 20 abuts the cutting wheel 16, the adhesive sheet 14 may be cut such that the adhesive strips 12 are formed and separated upon passing through the second formation interface 32. If the second forming wheel 20 is positioned away from the cutting wheel 16, the adhesive strips 12 may be partially formed by passing through the second formation interface 32 such that the adhesive strips 12 remain joined. Thus, by varying the dimensions of the second formation interface 32, the extent to which the adhesive sheet 14 is cut and the extent to which the adhesive strips 12 are formed by passing through the second formation interface 32 may be varied.

As is discussed in more detail below, the second formation interface 32 may present dimensions different than those presented by the first formation interface 24 such that the adhesive sheet 14 is cut differently upon passing through the first and second interfaces 24, 32.

In some embodiments, the position of the second forming wheel 20 may be fixed such that the second formation interface 32 presents static dimensions. However, in other embodiments, the second forming wheel 20 may be repositionable to enable the second formation interface 32 to present variable dimensions and variable cutting functionality as is discussed in the preceding paragraph. As illustrated in FIGS. 1 and 5, the second forming wheel 20 may be coupled with a second fixed guide 34 to enable the second forming wheel 20 to be slidably repositioned while remaining properly oriented with respect to the cutting wheel 16. The second forming wheel 20 may be spring-biased to facilitate its proper positioning.

In a similar manner to the first forming wheel 18, the second forming wheel 20 may be manually repositioned by the operator to vary the dimensions of the second formation interface 32, such as by sliding the second forming wheel 20 along the second fixed guide 34. However, in some embodiments, the second forming wheel may be coupled with a second positioning element, such as an electric motor, solenoid, or the like, to automate positioning of the second forming wheel 20. For example, the second positioning element may be controlled by the controller 30 to enable one or both of the forming wheels 18, 20 to be accurately positioned without operator involvement. The second positioning element may be coupled and/or mounted to the mounting rail 36 to statically affix its position in relation to the cutting wheel 16. The second positioning element may be integral with the first positioning element 28 or be configured as a separate unit.

Figure 9:
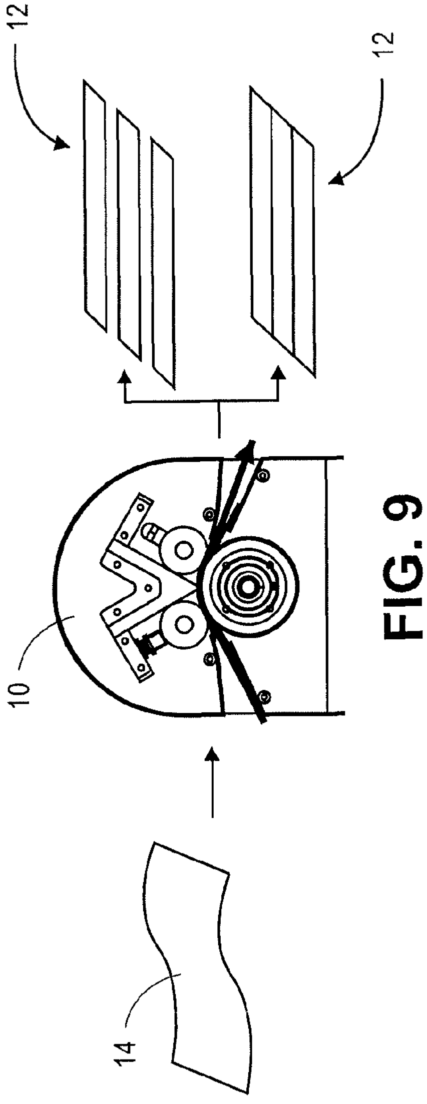
FIG. 9 is a schematic illustrating an adhesive sheet being formed into a plurality of adhesive strips.

The forming wheels 18, 20 may each be operable to be independently placed to allow the formation interfaces 24, 32 to each present different dimensions. For example, the first forming wheel 18 may be positioned to partially cut the adhesive sheet 14 and set the width of each adhesive strip 12 and the second forming wheel 20 may be positioned to finish the strip-forming process by fully cutting the adhesive sheet 14 to separate the adhesive strips 12. As should be appreciated, the forming wheels 18, 20 and formation interfaces 24, 32 may each be set to provide any degree of cutting action. For example, as illustrated in FIG. 9, the forming wheels 18, 20 may be positioned such that the adhesive sheet 14 is only partially cut to form a charge comprising joined adhesive strips 12.

In some embodiments, the forming apparatus 10 may include an extraction rake 38 comprising a plurality of tines 40 operable to be received within at least some of the circumferential grooves 22 to extract the adhesive strips 12 therefrom. At least portions of the rake 38 may include and/or be comprised of a low-friction material to facilitate proper extraction of the adhesive strips 12. However, the rake 38 may comprise or be formed of any material operable to at least partially extract the adhesive strips 22 from the circumferential grooves.

Figure 4:
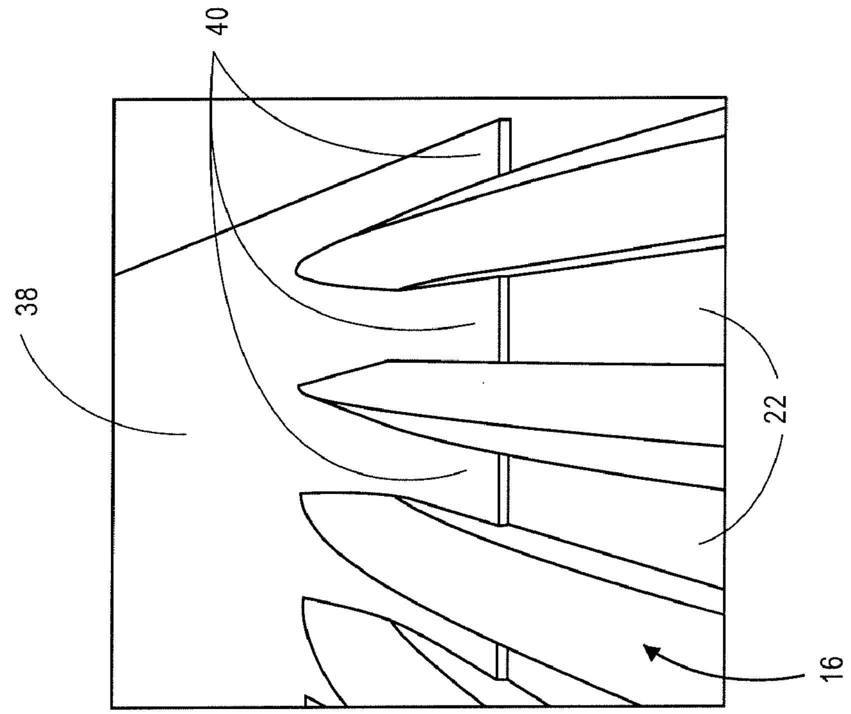
FIG. 4 is a perspective view of an extraction rake coupled with a portion of the cutting wheel of FIG. 2.

As illustrated in FIG. 4, the tines 40 may be operable to be retained within the circumferential grooves 22 such that as the cutting wheel 16 rotates the tines 40 are forced under the adhesive strips 12 to extract the adhesive strips 12 from the circumferential grooves 22. In embodiments where the circumferential grooves 22 includes the rake-receiving section 22*a*, the tines 40 may be received within the rake-receiving section 22*a* to extract the adhesive strips 12 without damage. The extraction rake 38 additionally may function as an output guide to guide the adhesive strips 12 away from the cutting wheel 16 and towards an operator or another forming apparatus.

In some embodiments, the forming apparatus 10 may include a feed guide 42 positioned in proximity to the cutting wheel 16 that is operable to at least partially support the adhesive sheet 14 to facilitate in the reception of the adhesive sheet 14 by the cutting wheel 16. The feed guide 42 may include tines similar to the tines 40 discussed above to enable the feed guide 42 to closely abut the cutting wheel 16 to transfer the adhesive sheet 14 thereto. The feed guide 42 may be positioned in proximity to the first formation interface 24 as is illustrated in FIG. 5.

The forming apparatus 10 may also include a motor 44 coupled with the cutting wheel 16 and operable to rotate the cutting wheel 16 to force the adhesive sheet 14 through the first and second formation interfaces 24, 32. The motor 44 can additionally or alternatively be coupled with the forming wheels 18, 20 to forcibly rotate the forming wheels 18, 20. The motor 44 can include any element or combination of elements operable to rotate the cutting wheel 16, including AC and DC electric motors. The motor 44 may also be coupled with the controller 30 to enable the controller 30 to control the rotation of the cutting wheel 16 and the position of the forming wheels 18, 20.

In operation, the adhesive sheet 14 may be provided to the cutting wheel 16 using the feed guide 42. The cutting wheel 16 may be rotated to engage the adhesive sheet 14 and force the adhesive sheet 14 through the first and second formation interfaces 24, 32. The adhesive sheet 14 is at least partially cut upon passing through the formation interfaces 24, 32 by being at least partially forced into the circumferential grooves 22. In some embodiments, the adhesive sheet 14 is formed to correspond to the dimensions of the circumferential grooves 22 upon passing through the formation interfaces 24, 32.

Figure 7:
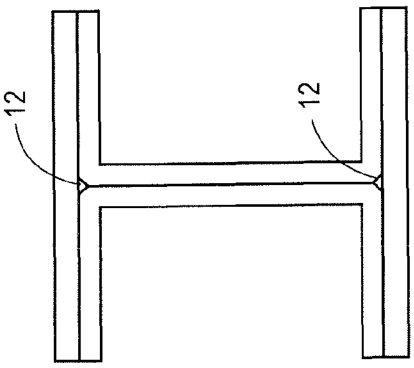
FIG. 7 is an environmental view showing adhesive strips formed by the apparatus of FIG. 1 being used as radius filler.

The operator and/or controller 30 may vary a dimension of the first formation interface 24 and/or second formation interface 32 before, during, or after the forming process. For example, the controller 30 may vary the position of the first forming wheel 18 to increase its distance from the cutting wheel 16 to cause less or no cutting of the adhesive sheet 14 as it passes through the first formation interface 24. The position of the second forming wheel 18 may similarly be varied to affect the extent to which the adhesive sheet 14 is cut upon passing through the second formation interface 32. Thus, the forming apparatus 10 may be utilized to cut the adhesive sheet 14 by any amount at each formation interface 24, 32. After formation, the adhesive strips 12 may be used for any purpose, including to fill radius gaps, as is illustrated in FIG. 7.

It is believed that embodiments of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus operable to form a plurality of adhesive strips from an adhesive sheet, the apparatus comprising:

first and second forming wheels;

a cutting wheel including a plurality of circumferential grooves, the cutting wheel positioned in proximity to the first and second forming wheels to define a first formation interface with the first forming wheel and a second formation interface with the second forming wheel, the cutting wheel operable to receive at least a portion of the adhesive sheet, and rotate to force at least a portion of the adhesive sheet through the first formation interface and the second formation interface such that the adhesive sheet is at least partially cut by at least one of the circumferential grooves at both the first and second formation interfaces to at least partially form the adhesive strips; and an extraction rake comprising a plurality of tines operable to be received within at least some of the circumferential grooves to extract the adhesive strips therefrom.

2. The apparatus of claim 1, further including a motor operable to rotate the cutting wheel.

3. The apparatus of claim 1, further including a feed guide positioned in proximity to the cutting wheel and operable to at least partially support the adhesive sheet to facilitate in the reception of the adhesive sheet by the cutting wheel.

4. The apparatus of claim 1, wherein the first forming wheel is repositionable to enable a dimension of the first formation interface to be varied.

5. The apparatus of claim 4, further including a first positioning element operable to reposition the first forming wheel to vary the dimension of the first formation interface.

6. An apparatus operable to form a plurality of adhesive strips from an adhesive sheet, the apparatus comprising:

first and second forming wheels;

a cutting wheel including a plurality of circumferential grooves, the cutting wheel positioned in proximity to the first and second forming wheels to define a first formation interface with the first forming wheel and a second formation interface with the second forming wheel, the first forming wheel being repositionable to enable a dimension of the first formation interface to be varied, the cutting wheel operable to receive at least a portion of the adhesive sheet, and rotate to force at least a portion of the adhesive sheet through the first formation interface and the second formation interface such that the adhesive sheet is at least partially cut by at least one of the circumferential grooves at both the first and second formation interfaces to at least partially form the adhesive strips;

a motor coupled with the cutting wheel and operable to rotate the cutting wheel to force the adhesive sheet through the first and second formation interfaces; and an extraction rake comprising a plurality of tines operable to be received within at least some of the circumferential grooves to extract the adhesive strips therefrom.

7. The apparatus of claim 6, further including a feed guide positioned in proximity to the cutting wheel and operable to at least partially support the adhesive sheet to facilitate in the reception of the adhesive sheet by the cutting wheel.

8. The apparatus of claim 6, wherein said second formation interface presents fixed dimensions.

9. The apparatus of claim 6, further including a first positioning element operable to reposition the first forming wheel to vary the dimension of the first formation interface.

10. The apparatus of claim 6, wherein each of the circumferential grooves presents a non-rectangular cross-sectional area.

11. The apparatus of claim 6, wherein each of the circumferential grooves includes a bottom rake-receiving section presenting a generally rectangular cross-sectional area and a top strip-formation section presenting a generally trapezoidal cross-sectional area.

12. An apparatus operable to form a plurality of adhesive strips from an adhesive sheet, the apparatus comprising:

first and second forming wheels;

a cutting wheel including a plurality of circumferential grooves, each of the circumferential grooves including a bottom rake-receiving section presenting a generally rectangular cross-sectional area and a top strip-formation section presenting a generally trapezoidal cross-sectional area, the cutting wheel positioned in proximity to the first and second forming wheels to define a first formation interface with the first forming wheel and a second formation interface with the second forming wheel, the first forming wheel being repositionable to enable a dimension of the first formation interface to be varied, the cutting wheel operable to receive at least a portion of the adhesive sheet, and rotate to force at least a portion of the adhesive sheet through the first formation interface and the second formation interface such that the adhesive sheet is at least partially cut by at least one of the circumferential grooves at both the first and second formation interfaces to at least partially form the adhesive strips;

a motor coupled with the cutting wheel and operable to rotate the cutting wheel to force the adhesive sheet through the first and second formation interfaces;

a first positioning element operable to reposition the first forming wheel to vary the dimension of the first formation interface; and an extraction rake comprising a plurality of tines operable to be received within at least some of the rake-receiving sections presented by the circumferential grooves to extract the adhesive strips therefrom.

13. The apparatus of claim 12, further including a feed guide positioned in proximity to the cutting wheel and operable to at least partially support the adhesive sheet to facilitate in the reception of the adhesive sheet by the cutting wheel.

* * * * *